(12) United States Patent
Frejd et al.

(10) Patent No.: US 12,215,864 B2
(45) Date of Patent: Feb. 4, 2025

(54) COMBUSTION SECTION WITH A CASING SHIELDING

(71) Applicant: Siemens Energy Global GmbH & Co. KG, Bayern (DE)

(72) Inventors: Mikael Frejd, Norrköping (SE); Johan Nilsson, Skärblacka (SE); Daniel Silfver, Norrköping (SE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 18/270,855

(22) PCT Filed: Oct. 12, 2021

(86) PCT No.: PCT/EP2021/078132
§ 371 (c)(1),
(2) Date: Jul. 4, 2023

(87) PCT Pub. No.: WO2022/156925
PCT Pub. Date: Jul. 28, 2022

(65) Prior Publication Data
US 2024/0302043 A1    Sep. 12, 2024

(30) Foreign Application Priority Data
Jan. 25, 2021   (EP) .................................. 21153211

(51) Int. Cl.
*F23R 3/00* (2006.01)
*F01D 25/14* (2006.01)
(Continued)

(52) U.S. Cl.
CPC ............ *F23R 3/002* (2013.01); *F01D 25/145* (2013.01); *F23R 3/46* (2013.01); *F23R 3/50* (2013.01); *F23R 3/60* (2013.01); *F05D 2260/231* (2013.01)

(58) Field of Classification Search
None
See application file for complete search history.

(56) References Cited

U.S. PATENT DOCUMENTS

| 4,719,748 A | 1/1988 | Davis, Jr. |
| 5,619,855 A | 4/1997 | Burrus |
| (Continued) | | |

FOREIGN PATENT DOCUMENTS

EP   2784267 A2   10/2014

OTHER PUBLICATIONS

PCT International Search Report and Written Opinion of International Searching Authority mailed Feb. 23, 2022 corresponding to PCT International Application No. PCT/EP2021/078132 filed Oct. 12, 2021.

*Primary Examiner* — Scott J Walthour
(74) *Attorney, Agent, or Firm* — Wolter Van Dyke Davis, PLLC

(57) ABSTRACT

A combustion section of a gas turbine includes an annular combustion chamber, a burner arrangement upstream of the combustion chamber, an annular compressor diffusor, and an annular combustion casing. The combustion casing has an outer section wall, an upstream section wall, and an inner section wall. The inner section wall extends along the rotor axis and is arranged between the burner arrangement and the compressor diffusor. A shielding is attached to the inner section wall at the side facing the rotor axis with a free space in-between at least. An outer diffusor wall of the compressor diffusor extends in axial direction up to the upstream half of the shielding.

19 Claims, 3 Drawing Sheets

(51) Int. Cl.
*F23R 3/46* (2006.01)
*F23R 3/50* (2006.01)
*F23R 3/60* (2006.01)

(56) References Cited

U.S. PATENT DOCUMENTS

2010/0257869 A1 10/2010 Cornelius
2014/0290272 A1* 10/2014 Mulcaire ............... F04D 29/542
60/39.83

\* cited by examiner

COMBUSTION SECTION WITH A CASING SHIELDING

CROSS REFERENCE TO RELATED APPLICATIONS

This application is the US National Stage of International Application No. PCT/EP2021/078132 filed 12 Oct. 2021, and claims the benefit thereof. The International Application claims the benefit of European Application No. EP21153211 filed 25 Jan. 2021.

FIELD OF INVENTION

The invention is about the combustion section of a gas turbine comprising an annular combustion chamber and an annular combustion casing wherein the combustion casing comprises different sections with means for protecting against the fast temperature change.

BACKGROUND OF INVENTION

From the state-of-the-art gas turbines with an annular combustion chamber are well known. In the usual arrangement combustion casing is arranged outside of the combustion chamber. Further, dependent on the arrangement of the combustion chamber relative to the flow pass through and compressor and an expansion turbine the combustion casing comprises further an upstream section which is arranged upstream of the combustion chamber and extends in radial direction. To achieve sufficient stiffness and also to enable the fixation of the combustion chamber a further inner section of the combustion casing is arranged closer to the rotor axis extending in axial direction starting from the radial inner end of the upstream section. Due to the location of the inner section it is flowed around by compressed air and further gets heated due to the arrangement close to the combustion chamber. This leads to the thermal expansion of the inner section, which especially at the start-up of the gas turbine further leads to a thermal stress.

To avoid critical stress at parts of the gas turbine the start-up proceeding is slowed down, or additional cooling features are applied.

SUMMARY OF INVENTION

An object of the current invention is the simplification of the cooling features and thereby enable rapid start-up of the gas turbine.

The object is solved by a combustion section according to the independent claim. Advantage solutions are subject of the subclaims.

The generic combustion section is intentionally part of the gas turbine. Thereby, the gas turbine defines the rotor axis and has an upstream side and a downstream side. The gas turbine comprises a further compressor section, which is arranged on the upstream side relative to the combustion section, and expansion turbine section, which is arranged downstream relative to the combustion section.

Each combustion section comprises a combustion chamber. Here, it is an annular combustion chamber surrounding the rotor axis. Further the combustion section comprises burner arrangement with several burners distributed in circumferential direction located upstream of the combustion chamber.

Downstream to the compressor section of the gas turbine at least partly within the combustion section and an annular compressor diffusor is arranged. The compressor diffusor comprises an annular inner diffusor wall and an annular outer diffusor wall defining the flow pass through the compressor diffusor. Here a wall end of the outer diffusor wall located at the downstream side of the outer diffusor wall is further relevant for the invention.

The combustion section further comprises an annular combustion casing surrounding at least partly the annular combustion chamber. Here the combustion casing has outer section wall and an upstream section wall and an inner section wall. The outer section wall extends along the rotor axis and is arranged on the radial outer side relative to the combustion chamber. The upstream section wall extends from the upstream end of the outer section wall radial inwards and is arranged therefore upstream relative to the combustion chamber. In the common solution the burner arrangement penetrates the upstream section wall, but it is also possible that the burner arrangement is also covered by the combustion casing and therefore located downstream to the upstream section wall. The inner section wall extends along the rotor axis starting from the radial inner end of the upstream section wall. Here, the inner section wall is located between the burner arrangement on the radial outer side and the compressor diffusor on the radial inner side.

Thereby, the outer diffusor wall is overlapping at least partly in axial direction the inner section wall. Accordingly, the wall end is located in axial direction between the upstream section wall and the downstream end of the inner section wall.

To protect the combustion section against thermal stress a shielding is arranged within the combustion section. Although the combustion chamber causes a high thermal load to the parts of the combustion section the shielding is arranged at the inner section wall at the side facing the rotor axis. It is necessary to keep a free space between the shielding and the inner section wall for at least half of the length of the inner section wall. Thereby, the wall end of the outer diffusor wall needs to be arranged in axial direction between the upstream end of the shielding and the middle of the shielding. As result the flow of compressed air passes first the outer diffusor wall and further the shielding.

It is noted, that it is not necessary, that the shielding has no contact with the inner section wall or that the free space continuous along the whole length of the shielding. First, some attachment means could be applied to attach the shielding to the inner section wall. Second the free distance between the inner section wall and the shielding could be reduced to zero at the beginning and/or the end of the shielding.

With the arrangement of the shielding at the inner side of the inner section wall the displacement of the compressor section parts could be modified especially at the start-up of the gas turbine in such a way, that thermal stress is essentially reduced compared to the common solution without a shielding at the inner side of the inner section wall.

To achieve the improvement due to the shielding it is not necessary, to arrange the shielding also at the upstream section wall. Instead it is advantageous, if there is a distance in axial direction between the upstream end of the shielding and the radial inner end of the upstream section wall.

There are in principle two possibilities to achieve the free space between the shielding and the inner section wall (which could also be combined). First it is possible to attach the shielding spaced apart at the inner section wall, wherein the inner section wall has at the inner side facing the rotor axis a continuous inner surface, for example a cylindrical radial inner side. But it is advantageous to arrange a recess at the radial inner side at the inner section wall. Thereby, it is in particular to arrange the shielding within the recess, so that the radial inner side of the inner section wall upstream of the shielding and downstream of the shielding and further the radial inner side of the shielding form a continuous inner smooth surface.

If a recess is given, the ground of the recess is the radial inner side of the inner section wall in the area of the shielding. If the radial inner side is mentioned in combination with the shielding regular the inner section wall within the same axial position as the shielding is meant with respect to the inner side of the inner section wall.

The size of the free space between the shielding and the inner section wall in radial direction should be sufficient to enable the thermal protection feature. Therefore, it is advantageous if the free space (free distance) between the shielding and the radial inner side of the inner section wall is at least 0.1 times the thickness of the arrangement from the radial outer side of the inner section wall to the radial inner side of the shielding. Here, it is in particular advantageous, if the free distance is at least 0.15-times the thickness of the arrangement. (Wherein the free distance and the thickness are determined at the same axial position.)

To keep the size of the arrangement within a useful range the free space should be kept small. Therefore, it is advantageous, if the free distance between the radial outer side of the shielding to the radial inner side of the inner section wall is at most 0.3 times the thickness of the arrangement from the radial outer side of the inner section wall to the radial inner side of the shielding. Here, it is in particular advantageous, if the free space is at most 0.2 times the thickness of the arrangement.

It is further beneficial to optimize the free space depending on the relative position of the outer diffusor wall. Here, it is advantageous if the free distance between the radial outer side of the shielding to the radial inner side of the inner section wall is at least 0.5 times the distance from the shielding to the outer diffusor wall. It is further in particular advantageous, if the free distance is at least 0.7 times the distance between the shielding and the outer diffusor wall.

On the other hand, it is advantageous, if the free distance between the radial outer side of the shielding to the radial inner side of the inner section wall is at most 1.5 times the distance from the shielding to the outer diffusor wall. It is further in particular advantageous, if the free distance is at most 0.9 times the distance between the shielding and the outer diffusor wall.

A further protection against a rapid heat transfer into the combustion casing, especially the inner section wall could be advantageously achieved, if an inner cover is attached on the outer side of the inner section wall. As result, it is arranged at the inner section wall opposite to the shielding. Here, it is necessary to have an inner gap between the inner cover and the inner section wall.

As there is less the problem with the space at the outer side of the inner section wall, the inner cover could be attached onto the inner section wall. To close the inner gap at the downstream side it is further advantageous, if the inner cover comprises a bend towards the inner section wall. Here, it is in particular advantageous if the bend is in contact with the inner section wall.

In connection with the shielding and the free space, it is preferred that the inner gap has a width between the inner section wall and the inner cover (without the bend) about the size of the free space between the radial outer side of the shielding to the radial inner side of the inner section wall. Here, it is advantageous, if the width is at least 0.6 times and at most 1.5 times the free distance. It is in particular advantageous, if the width is at least 0.8 times and at most 1.2 times the free distance.

Analog a further protection against a rapid heat transfer into the combustion casing, especially the upstream section wall could be advantageously achieved, if an upstream cover is attached on the downstream side of the upstream section wall. Here, it is necessary to have an upstream gap between the upstream cover and the upstream section wall.

As there is less the problem with the space at the downstream side of the downstream section wall, the upstream cover could be attached onto the upstream section wall. To close the upstream gap at the radial outer side it is further advantageous, if the upstream cover comprises a bend towards the upstream section wall. Here, it is in particular advantageous if the bend is in contact with the upstream section wall.

In connection with the shielding and the free space, it is preferred that the upstream gap has a width between the upstream section wall and the upstream cover (without the bend) about the size of the free space between the radial outer side of the shielding to the radial inner side of the inner section wall. Here, it is advantageous, if the width is at least 0.6 times and at most 1.5 times the free distance. It is in particular advantageous, if the width is at least 0.8 times and at most 1.2 times the free distance.

To optimize the thermal protection of the combustion casing in the edge between the upstream section wall and the inner section wall it is further advantageous to connect the upstream cover with the inner cover. With this solution a continuous gap from the inner gap to the upstream gap could be achieved with a protective distance between the inner cover and upstream cover to the inner section wall and upstream section wall.

The following figures show an exemplary solution for the usage of a shielding at a combustion casing.

DETAILED DESCRIPTION OF INVENTION

Figure 1:
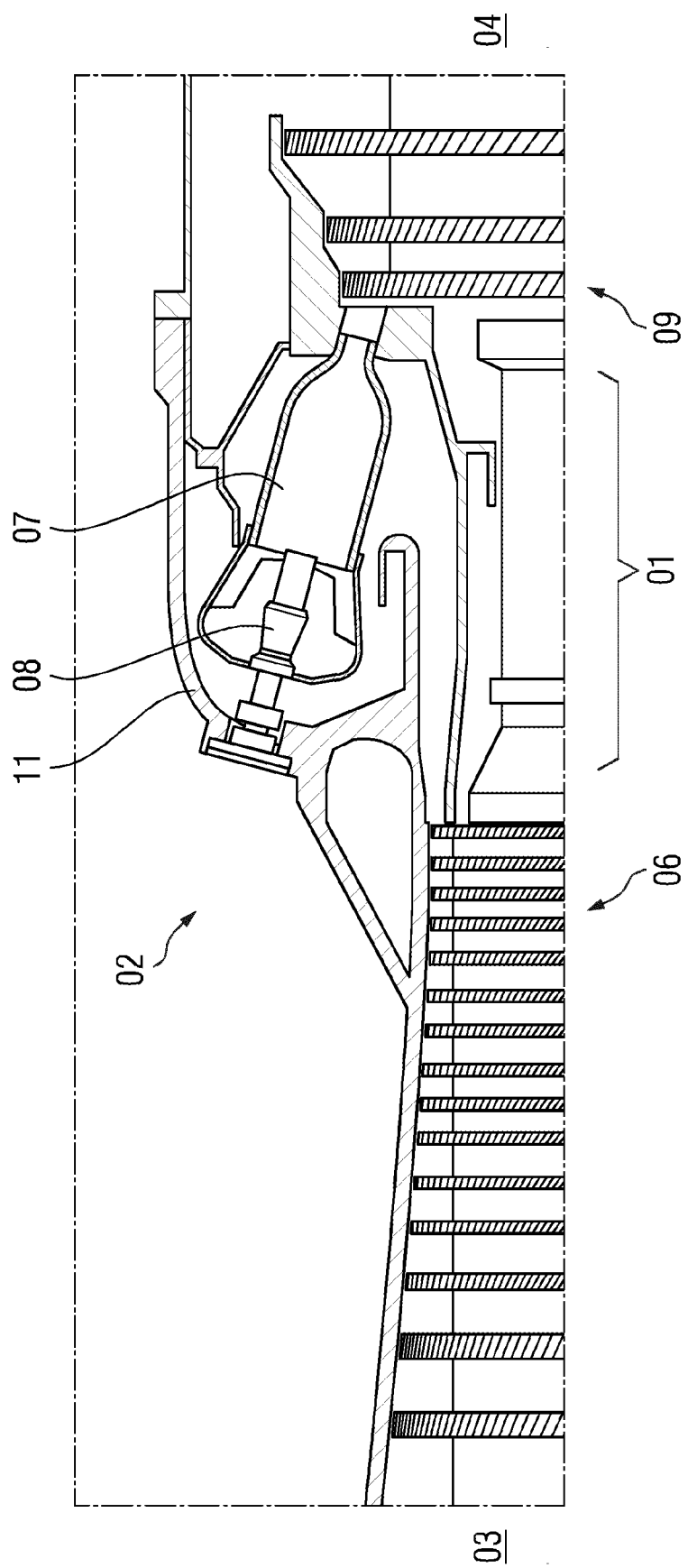
FIG. 1 a schematic sketch of a gas turbine is shown.

In FIG. 1 a schematic sketch of a gas turbine 02 is shown with a compressor section 06 at the upstream side 03 and an expansion turbine section 09 at the downstream side 04 of the gas turbine 02. In-between the combustion section 01 is located. Here the combustion section 01 comprises an annular type combustion chamber 07. At the upstream side 03 of the combustion section 07 a burner arrangement 08 is attached comprises serval burners distributed in circumferential direction. The combustion chamber 07 is covered by a combustion casing 11, wherein the combustion casing 11 is penetrated by the burners of the burner arrangement 08.

Figure 2:
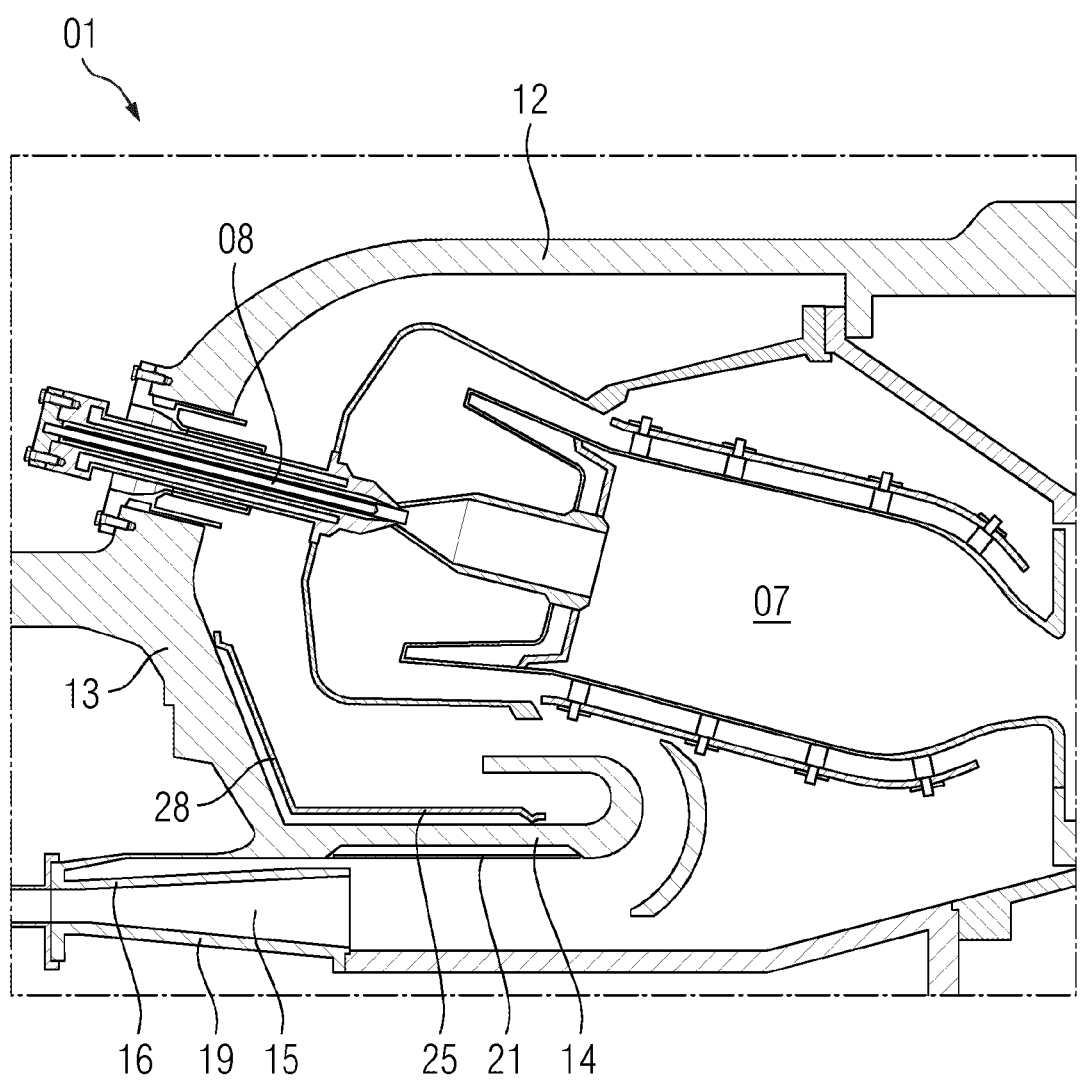
FIG. 2 an example for an inventive combustion section is shown.

In FIG. 2 an exemplary design for an inventive combustion section 01 is shown. The combustion chamber 07 is extending around the rotor axis. On the upstream side relative to the combustion chamber 07 burners of the burner arrangement 08 are located. The combustion casing 11 is built in this exemplary solution by an outer section wall 12, which 12 is arranged on the radial outer side of the combustion chamber 07, and an upstream section wall 13, which 13 is arranged at the upstream side of the combustion chamber 07 and is penetrated by the burners of the burner arrangement 08, and an inner section wall 14, which 14 is arranged on the radial inner side relative to the burner arrangement 08.

The combustion section further comprises a compressor diffusor 15, which 15 is attached at the downstream side of the compressor section 06 and is located on the side facing the rotor axis relative to the inner section wall 14. The diffusor is built in this arrangement by an outer diffusor wall 16 on the radial outer side of the compressor diffusor 15 and an inner diffusor wall 19 on the radial inner side of the compressor diffusor 15.

Figure 3:
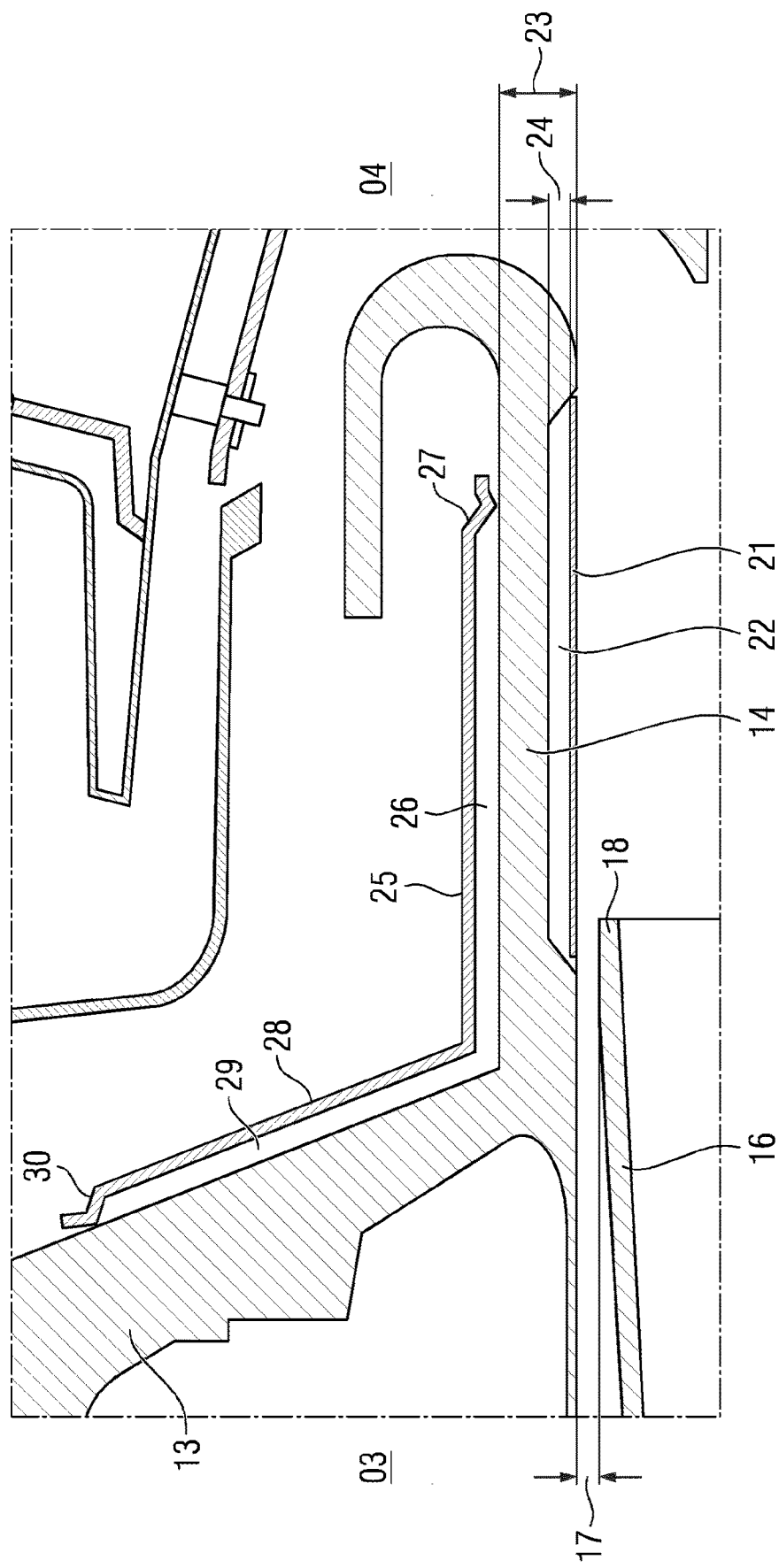
FIG. 3 the arrangement of the shielding and covers at the combustion casing according to FIG. 2 is shown.

The invention could be explained further by the detailed view FIG. 3. As it is shown a shielding 21 is attached at the inner section wall 14 with a free space in-between. In this exemplary solution the free space 22 is realized by a recess 22. To achieve a smooth inner surface with the inner section wall 14 upstream of the shielding 21 and downstream of the shielding 21 the shielding 21 is arranged within the recess 22 as shown in the figure. The recess leads to a free distance 24 between the radial inner side of the inner section wall 14 and the radial outer side of the shielding 21—in respect to the same axial position.

The arrangement with the inner section wall 14 and the shielding 21 defines a thickness 23 of the arrangement at the location of the shielding 21 from the radial inner side of the shielding 21 to the radial outer side of the inner section wall 14. In this exemplary solution a free distance 24 of about a quarter of the thickness 23 of the arrangement is used.

What could be seen next is the wall end 18 of the outer diffusor wall 16, which is located in axial direction between the upstream end of the shielding 21 and the middle of the shielding 21. As shown in the figure a distance from the wall end 18 to the shielding 21 is about the same as the free distance 24.

As further improvement an inner cover 25 arranged on the radial outer side at the inner section wall 14, and an upstream cover 28 arranged on the downstream side at the upstream section wall 13 is used. At the inner cover 25 an inner gap 26 and at the upstream cover 28 an upstream gap 29 is applied to protect the combustion casing 11 especially in the corner between the upstream section wall 13 and the inner section wall 14 against rapid thermal expansion due to the start-up of the gas turbine 02. As further option at both covers 25, 28 a bend 27, 30 is arranged, which are each in contact with the respective section wall 13, 14.

The invention claimed is:

1. An assembly for a gas turbine, the assembly comprising a rotor axis, a compressor section, and a combustion section, the combustion section comprising:
    an upstream side and a downstream side;
    an annular combustion, chamber;
    a burner arrangement upstream of the annular combustion, chamber;
    an annular compressor diffusor downstream of the compressor section and having an annular inner diffusor wall and an annular outer diffusor wall, the annular outer diffuser wall having a wall end at a downstream side of the annular outer diffusor wall;
    an annular combustion casing having an outer section wall extending along the rotor axis and arranged radially outward relative to the annular combustion chamber, an upstream section wall extending along a radial direction and arranged upstream relative to the annular combustion chamber, and an inner section wall extending along the rotor axis and arranged between the burner arrangement and the compressor diffusor, wherein the outer diffusor wall the inner section wall in an axial direction; and
    a shielding attached to the inner section wall on a radially inner side of the inner section wall facing the rotor axis, wherein a free space is defined between the shielding and the radially inner side of the inner section wall along at least half of an axial length of the inner section wall, wherein the wall end of the annular outer diffuser wall is arranged axially between an upstream end of the shielding and an axial midpoint of the shielding.

2. The assembly according to claim 1, wherein the upstream end of the shielding is axially spaced apart from the upstream section wall.

3. The assembly according to claim 1, wherein the inner section wall comprises a recess spaced apart from each of the upstream section wall and a downstream end of the inner section wall, wherein the recess is covered by the shielding.

4. The assembly according to claim 3, wherein the radially inner side of the inner section wall upstream and downstream of the shielding forms a continuous surface with a radially inner side of the shielding.

5. The assembly according to claim 1, wherein a free distance from the shielding to the radially inner side of the inner section wall is at least 0.1 times, and at most 0.3 times, a thickness from a radially outer side of the inner section wall to a radially inner side of the shielding.

6. The assembly according to claim 5, wherein the free distance is at least 0.15 and/or at most 0.2 times the thickness from the radially outer side of the inner section wall to the radially inner side of the shielding.

7. The assembly according to claim 1, wherein a free distance from the shielding to the radially inner side of the inner section wall is at least 0.5 times, and at most 1.5 times, a distance from the shielding to the outer diffuser wall.

8. The assembly according to claim 7, wherein the free distance is at least 0.7 times and/or at most 0.9 times the distance from the shielding to the outer diffuser wall.

9. The assembly according to claim 1, wherein an inner cover is attached on a radially outer side of the inner section wall, an inner gap defined between the inner cover and the radially outer side of the inner section wall.

10. The assembly according to claim 9, wherein the inner cover comprises a downstream end having a bend.

11. The assembly according to claim 10, wherein the bend is in contact with the inner section wall.

12. The assembly according to claim 9, wherein a width of the inner gap is at least 0.6 times, and at most 1.5 times, a free distance from the shielding to the radially inner side of the inner section wall.

13. The assembly according to claim 12, wherein the width of the inner gap is at least 0.8 times and/or at most 1.2 times the free distance.

14. The assembly according to claim 1, wherein an upstream cover is attached on a downstream side of the upstream section wall, an upstream gap defined between the upstream cover and the downstream side of the upstream section wall.

15. The assembly according to claim 14, wherein the upstream cover comprises a radially outer end having a bend.

16. The assembly according to claim 15, wherein the bend is in contact with the upstream section wall.

17. The assembly according to claim 14, wherein a width of the upstream gap is at least 0.6 times, and at most 1.5 times, a free distance from the shielding to the radially inner side of the inner section wall.

18. The assembly according to claim 17, wherein the width of the upstream gap is at least 0.8 times and/or at most 1.2 times the free distance.

19. The assembly according to claim 14, wherein an inner cover is attached on a radially outer side of the inner section wall, an inner gap defined between the inner cover and the radially outer side of the inner section wall, and wherein the inner cover is connected to the upstream cover, the inner gap and the upstream gap being connected to define a continuous gap.

* * * * *